Figure 5:
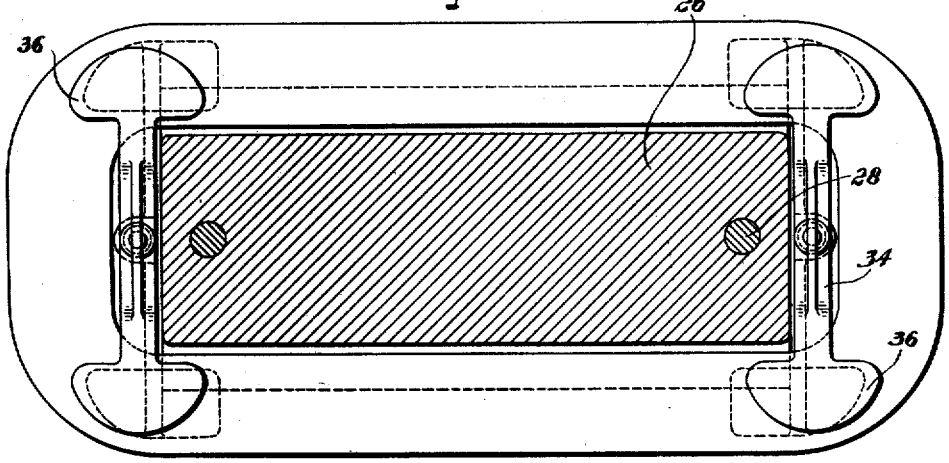

J. D. FIRMIN.
DYNAMO ELECTRIC MACHINE.
APPLICATION FILED FEB. 19, 1906.
922,119.
Patented May 18, 1909.
2 SHEETS—SHEET 1.
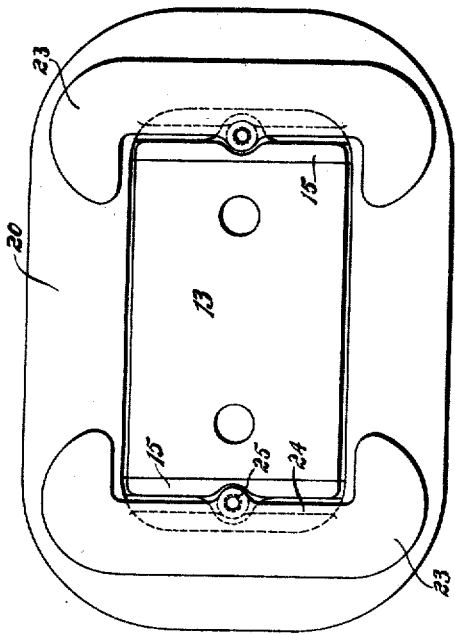
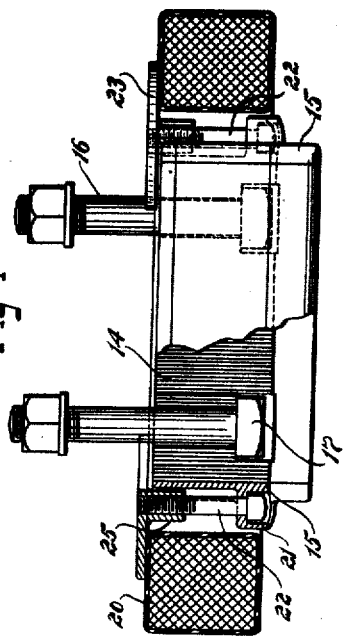
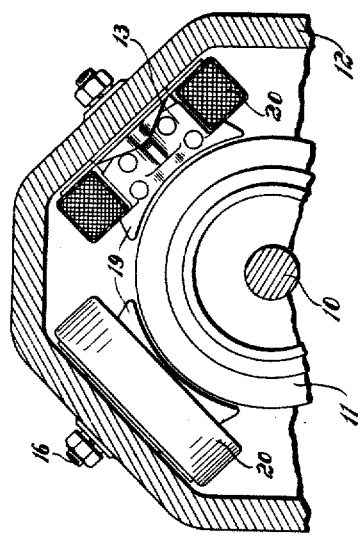
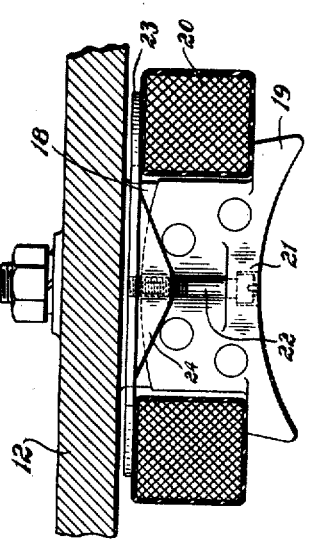
WITNESSES
George J. Schwartz
Fred J. Kinsey
INVENTOR
John D. Firmin.
By
Chas. E. Lord
ATTORNEY

J. D. FIRMIN.
DYNAMO ELECTRIC MACHINE.
APPLICATION FILED FEB. 19, 1906.

922,119.

Patented May 18, 1909.
2 SHEETS—SHEET 2.

WITNESSES:
George J. Schwarz
Fred J. Kinsey

INVENTOR
John D. Firmin.
By
Chas. E. Lord
ATTORNEY.

UNITED STATES PATENT OFFICE.

JOHN D. FIRMIN, OF NORWOOD, OHIO, ASSIGNOR TO THE BULLOCK ELECTRIC MANUFACTURING COMPANY, A CORPORATION OF OHIO.

DYNAMO-ELECTRIC MACHINE.

No. 922,119.    Specification of Letters Patent.    Patented May 18, 1909.

Application filed February 19, 1906. Serial No. 301,747.

*To all whom it may concern:*

Be it known that I, JOHN D. FIRMIN, citizen of the United States, residing at Norwood, in the county of Hamilton and State of Ohio, have invented certain new and useful Improvements in Dynamo-Electric Machines, of which the following is a full, clear, and exact specification.

My invention relates to improvements in dynamo-electric machines and particularly to the means employed for holding the field coils of the machine firmly in place on the poles.

It is often the case that certain dynamo-electric machines, such as mill and railway motors, are subject to vibration and shocks which may have a detrimental effect if the parts are not all firmly held in place. Also changes in temperature and other climatic conditions have a tendency to loosen certain parts of the machines. Accordingly, under certain circumstances, the field coils, which fit closely upon the field poles or cores of the field magnets when the machines are first assembled, become loose and move on the poles, the insulation of the coils is abraded and punctured, and the coils become grounded or short-circuited.

One of the objects of my invention is to avoid the difficulties above enumerated and to provide means whereby the coils can at any time be tightened in case they become loose upon the poles.

A further object is to so clamp the coils to the poles that each pole and its coil can be removed together and without danger of the coil becoming loose on the pole.

In carrying out my invention I provide means on each field pole for drawing the field coil onto a support or seat on the pole.

More specifically considered, my invention consists in a dynamo-electric machine having a field-frame with inwardly projecting laminated field poles provided with end-plates and pole tips, coils on said poles, and means for clamping the coils to the pole tips, said means including clamping plates between the coils and the frame, and bolts engaging the end-plates and the clamping plates.

My invention still further consists in certain novel details of construction and combinations and arrangements of parts described in the specification and set forth in the appended claims.

Figure 6:
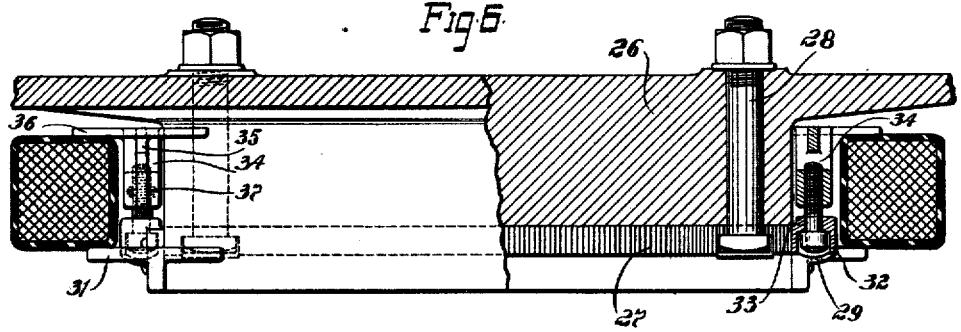

For a better understanding of my invention, reference is had to the accompanying drawings, in which;

Figure 1 is a partial sectional view of a four-pole motor equipped with my invention, only two of the field magnets of the motor being shown; Fig. 2 is a slightly enlarged sectional elevation showing a field pole in side elevation and the coil and field frame in section; Fig. 3 is a view of a detached pole, coil and clamping means, looking toward the outer end of the pole; Fig. 4 is a sectional elevation of the same, parts being broken away for the sake of clearness; Fig. 5 is a section through a modified form of a field pole showing the outer end of the coil in elevation and a modified form of clamping means; Fig. 6 is a side sectional elevation of the same, parts being removed for the sake of clearness; and Fig. 7 is a sectional end elevation of the same, the coil and the field frame being shown in section.

Referring to Figs. 1, 2, 3 and 4 of the drawings, I have shown at 10 a shaft of the motor on which is mounted the armature 11. The surrounding field frame 12, shown in section in Fig. 1 is provided with a plurality of field poles or field magnet cores 13, a four-pole machine being shown in the drawings. Each field pole consisting of laminæ 14 and end clamping plates 15 is held to the field frame by bolts 16 which are provided with enlarged heads 17 seated in recesses in the inner face of the pole. In the preferred form of my invention, the laminated field poles engage short pole stubs or projections 18 on the field frame. As is clearly shown in Figs. 1 and 2 the laminated poles are provided with laterally projecting pole tips 19, each of which has a flat portion forming a support or seat for a field coil 20 one of which surrounds each of the poles.

In order that the field coils may be held securely and firmly in place on the poles, whether the latter are attached to or detached from the machine, I provide means on the poles for clamping the coils onto supports or seats on the poles, preferably adjacent the inner ends thereof, which supports, in the preferred form of my invention shown in Figs. 1, 2, 3 and 4, are the ordinary pole tips. Each end-plate 15 is provided near its inner end with an enlarged portion 21 which is perforated and recessed to received the body and head of a clamping bolt 22. Between the frame and each coil and at opposite sides of each pole is a clamping plate or member 23. This clamping plate which is shown most clearly in Fig. 3 extends along the ends of the coils and has projections extending for a short distance along the sides of the coils. Each clamping plate has midway between its ends and extending between the coil and the pole, a ribbed portion 24, shown in Fig. 2, which is enlarged at its center at 25, and provided with a threaded hole or opening to receive the end of the clamping bolt 22. It is seen that, when the parts are assembled, by means of the bolts which engage the extensions of the end-plates, and by means of the clamping plates engaged by the bolts, the coils can be drawn securely and tightly onto the pole tips, and in case the coils become loose for any reason, as for example, shocks to the motor or severe changes in temperature, they can be tightened in place, by adjusting the clamping bolts 22.

Figure 7:
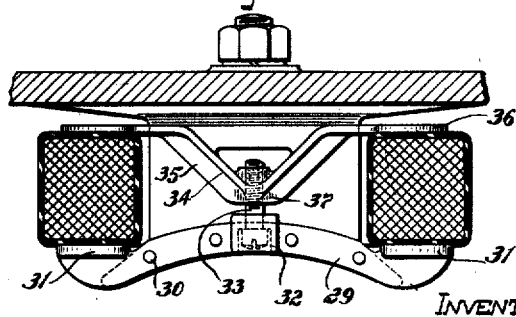

In Figs. 5, 6 and 7, a modification of my invention is shown. The field frame, in this case has solid field poles 26, which are provided with laminated pole shoes 27 held in place on the poles by means of bolts 28, in the same manner that the laminated poles are held in place in the construction previously described. In this modification the coils are not clamped to the pole tips, but are clamped to the end-plates which are provided with seats or supports for that purpose. The combined end-plates and coil supports are shown at 29, the plates are held to the pole-shoes by means of rivets 30, shown in Fig. 7. Each end-plate or end-member is provided at its ends with enlarged flat coil supports 31, and midway between its ends with an enlarged perforated and recessed portion 32, to receive the body and head of the clamping bolt 33. The clamping members 34, which are engaged by bolts 33, to clamp the coils onto the supports or seats, are slightly different in shape from those in the construction first described. The clamping members 34 which are located at opposite sides of the poles are each provided with a ribbed portion 35 extending along the pole piece, and between the coil and the pole, and at its ends with enlarged flat portions 36, adapted to engage the coil. The ribbed portion of each clamping member is provided at its center with an enlarged portion 37 having a tapped or threaded hole to receive the end of the clamping bolt 33. In this construction the coil is supported at its four corners, and is clamped to the supports by means of the bolts 33 and the clamping members 34. As in the first case, by turning the bolts 33, the coils can be adjustably clamped in place. It is also seen that, in either form of my invention, should the poles be removed from the machine the coils will be as securely clamped to the coil seats or supports as when the poles are on the frame of the machine.

It is obvious that many changes or modifications can be made in the details without departing from the spirit and scope of my invention, and I aim in my claims to cover all such modifications.

What I claim as new and desire to secure by Letters Patent is:—

1. In a dynamo-electric machine, a field frame, a plurality of field poles having field coils, means for securing the poles to the frame, a fixed coil support at the free end of each pole, and means independent of the frame and of the pole securing means for clamping coils to said supports.

2. In a dynamo-electric machine, a field frame, a plurality of inwardly projecting field poles having field coils, means for securing the poles to the frame, each pole having at its inner end a fixed coil support, and means independent of the frame and of the pole securing means for clamping the coils to said supports.

3. In a dynamo-electric machine, a field frame, a plurality of field poles having field coils, each field pole having at or near its free end fixed projecting portions, and adjustable means independent of the frame for adjustably clamping the coils to said portions.

4. In a dynamo-electric machine, a field frame, a plurality of inwardly projecting field poles, fixed coil supports or seats at the inner end of each field pole, and adjustable means independent of the frame for adjustably clamping each coil to its supports.

5. In a dynamo-electric machine, a field frame, inwardly projecting field poles, field coils thereon, fixed coil supports at opposite sides of the inner end of each pole, and adjustable means independent of the frame for adjustably clamping each coil to its supports.

6. In a dynamo-electric machine, a rotary armature, a field frame, field poles having field coils and fixed projecting pole tips, means for securing the poles to the frame, and means independent of the frame and of the pole securing means for clamping the coils to said pole tips.

7. In a dynamo-electric machine, a field member, field poles having projecting pole tips, coils on said field poles, and adjustable means independent of said member for adjustably clamping the coils tightly against the pole tips.

8. In a dynamo-electric machine, a field member, field poles having projecting pole tips at their inner ends, coils on said poles, and separate adjustable means on opposite sides of each pole for clamping the coil to the pole tips.

9. In a dynamo-electric machine, a field member having projecting field poles, coils on said poles, each pole having at or near its free end a coil support or seat, and means for clamping the coils against the seats, said means including clamping members which engage the ends of the coils, and bolts which engage said clamping members and are located intermediate the coils and poles.

10. In a dynamo-electric machine, a field frame having inwardly projecting field poles, coils on said poles, each pole having at its inner end coil supports or seats, and means for holding the coils to the supports or seat comprising clamps which engage the outer ends of the coils, and bolts which extend along the sides of the poles intermediate the latter and the coils.

11. In a dynamo-electric machine, a field frame having inwardly projecting field poles, coils on said poles, each pole having at its inner end on two opposite sides coil supports or seats, and means for clamping each coil to its supports comprising clamps which engage the outer end of the coil, and bolts which extend along the other two sides of the pole intermediate the latter and the coil.

12. In a dynamo-electric machine, a field frame having inwardly projecting field poles, each pole having a field coil and a pair of pole tips, and adjustable means for clamping the coil to the pole tips, said means comprising a pair of clamps and a pair of bolts.

13. In a dynamo-electric machine, a field frame, having inwardly projecting field poles provided with field coils, pole tips at the ends of the poles, and means for clamping each coil to the pole tips, said means including a plurality of independent members having coil clamping portions intermediate the frame and the coil, and bolts which engage said members and extend along the sides of the pole.

14. In a dynamo-electric machine, a field frame, laminated field poles having end-plates and pole tips, coils on said poles, and means for clamping each coil to the pole tips, said means including clamping plates between the coil and the frame and bolts engaging the end-plates and the clamping plates.

15. In a dynamo-electric machine, a field frame, inwardly projecting laminated field poles having end-plates and pole tips, a coil on each pole, each end-plate having near its inner end a lateral projection, and adjustable means for clamping the coil to the tips of the pole, said means including a pair of clamping plates between the frame and the coil and bolts engaging the plates and the projections on the end-plates.

16. In a dynamo-electric machine, a field frame, inwardly extending field poles, field coils thereon, coil supports at the inner end of each field pole, end-plates on said poles, and means for clamping the coils to said supports, said means including clamping members between the coils and the frame and bolts engaging the end-plates and clamping members.

17. In a dynamo-electric machine, a field frame, inwardly extending laminated field poles having pole tips and end-plates, coils on said poles, and means for adjustably clamping said coils against the pole tips, said means including clamping members at the outer portions of the coils and bolts engaging the clamping members and end-plates.

In testimony whereof I affix my signature, in the presence of two witnesses.

JOHN D. FIRMIN.

Witnesses:
ARTHUR F. KWIS,
FRED J. KINSEY.